Patented Aug. 4, 1931

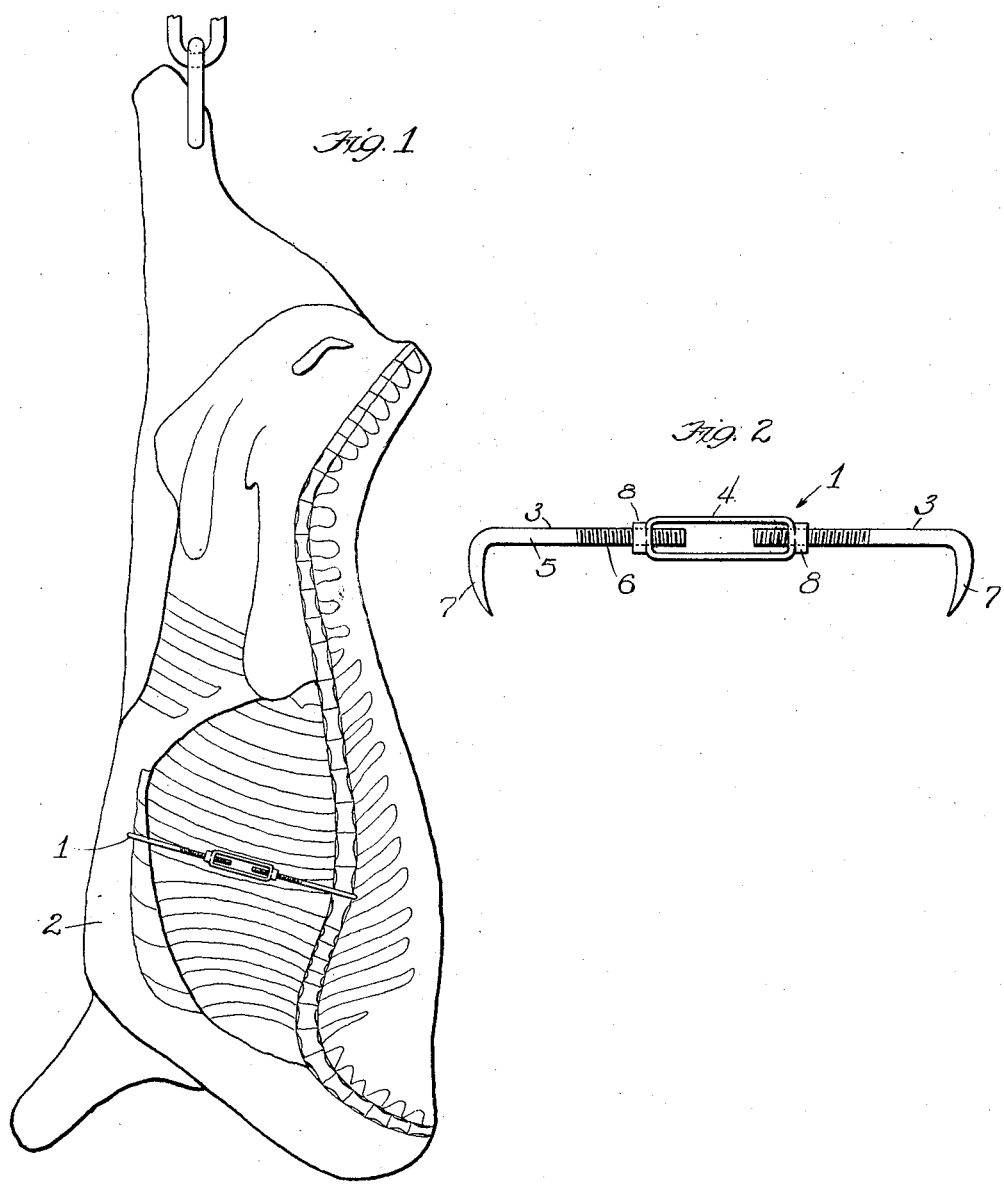

1,817,541

UNITED STATES PATENT OFFICE

JOHN CLIFTON AGAR, OF CHICAGO, ILLINOIS, ASSIGNOR TO SWIFT & COMPANY, OF CHICAGO, ILLINOIS, A CORPORATION OF ILLINOIS

METHOD OF HANDLING MEAT

Application filed November 2, 1928. Serial No. 316,716.

This invention relates to methods and means for holding the halves of beef carcasses each in its natural form or preferably in a somewhat artificially narrowed and thickened form after butchering and while being chilled and while being held in storage ready for the market.

The main objects of the invention are to provide for accomplishing these purposes while the sides are hung endwise immediately after butchering; to provide an improved method and a better means for thus improving and setting the form of the sides; to provide simple and readily adjustable tension means adapted for ready application to the backbone and plate or breast part of a side for transversely stressing the same convergently, in whatever position the side may be disposed.

An illustrative embodiment of this invention and its method of use is shown by the accompanying drawings, in which:

Figure 1 represents the inner face of a side of beef suspended by the hind leg, as customary in the handling of beef and with a tension holder set in place therein.

Fig. 2 is an enlarged side view of the holder shown in Fig. 1.

In the construction shown in the drawings, reference being had especially to Fig. 2, the holder 1 is of turnbuckle construction and is adapted for engaging the side of beef 2. The device comprises a pair of hook members 3 in combination with a connecting link 4. Each hook 3 includes a straight shank 5 threaded at one end as at 6 and having a pointed hook part 7 at the opposite end, the latter being disposed at substantially a right angle to the shank but the tip inclined backward somewhat toward the shank.

The link 4 has a central perforation at each end, as at 8, where it is threaded to receive the corresponding shank 6 of the coacting hook member 3. It is to be understood that the two hook shanks are threaded oppositely for the two ends of link 4 as customary in turnbuckle constructions.

The method of using this device is to first lengthen the holder by turning the link 4 in one direction and then applying one of the hook members 7 to a medial part of the breast bone and the other to an appropriate part substantially opposite thereto on the back bone, the side 2 being in any desired position, preferably hanging, as shown. The link 4 is then turned reversely to contract the holder and thereby bring the corresponding parts, plate and back, of the beef side together sufficiently to accomplish the desired result substantially as shown in Fig. 1.

Although but one specific embodiment of this invention is herein shown and described, it is to be understood that numerous details of the construction shown may be altered or omitted without departing from the spirit of the invention as defined by the following claim.

I claim:

In the meat packing industry the systematic method of enhancing the appearance and marketability of carcass sides which consists in appreciably narrowing each side by forcibly occluding somewhat the chest wall, immediately after dressing and while hung vertically for setting and storage, and causing it to so remain.

Signed at Chicago this 26th day of October 1928.

JOHN CLIFTON AGAR.